US012679665B2

(12) United States Patent
Durtschi

(10) Patent No.: US 12,679,665 B2
(45) Date of Patent: *Jul. 14, 2026

(54) TRANSPORT DEVICE HAVING A STORAGE DEVICE, AND METHOD FOR OPERATING SAME

(71) Applicant: FERAG AG, Hinwil (CH)

(72) Inventor: Andreas Durtschi, Wädenswil (CH)

(73) Assignee: FERAG AG, Hinwil (CH)

( * ) Notice: Subject to any disclaimer, the term of this patent is extended or adjusted under 35 U.S.C. 154(b) by 916 days.

This patent is subject to a terminal disclaimer.

(21) Appl. No.: 17/920,617

(22) PCT Filed: Apr. 13, 2021

(86) PCT No.: PCT/EP2021/059513
§ 371 (c)(1),
(2) Date: Oct. 21, 2022

(87) PCT Pub. No.: WO2021/219361
PCT Pub. Date: Nov. 4, 2021

(65) Prior Publication Data
US 2023/0150773 A1 May 18, 2023

(30) Foreign Application Priority Data
Apr. 27, 2020 (CH) ..................................... 00491/20

(51) Int. Cl.
*B07C 5/10* (2006.01)
*B07C 5/36* (2006.01)
(Continued)

(52) U.S. Cl.
CPC .............. *B65G 47/493* (2013.01); *B07C 5/10* (2013.01); *B07C 5/36* (2013.01); *B65G 1/0457* (2013.01); *B65G 43/08* (2013.01); *B65G 47/644* (2013.01)

(58) Field of Classification Search
CPC .... B65G 47/493; B65G 1/0457; B65G 43/08; B65G 47/644; B65G 47/648; B65G 17/20; B65G 47/05; B07C 5/10; B07C 5/36
See application file for complete search history.

(56) References Cited

U.S. PATENT DOCUMENTS 5,971,131 A     10/1999  Blattner et al.
6,139,240 A  *  10/2000  Ando ................... B65G 47/844
                                                    198/370.02
(Continued)

FOREIGN PATENT DOCUMENTS

AT           13875 U1     10/2014
DE      42 33 688 A1       4/1994
(Continued)

OTHER PUBLICATIONS

EPO (Riswijk, NL), English language translation of the International Search Report, Form PCT/ISA/210, for International Application PCT/EP2021/059513, Jul. 23, 2021 (3 pages).

*Primary Examiner* — Patrick H Mackey
(74) *Attorney, Agent, or Firm* — Pauley Erickson & Swanson

(57) ABSTRACT

A method for operating a transport apparatus with a storage apparatus and a corresponding transport apparatus includes the steps of providing the transport apparatus with the storage apparatus for storing transport units, including a plurality of transport units, a plurality of storage conveyors, and a feeding conveyor to the storage conveyors. The transport apparatus includes an optical sensor arranged at the feeding conveyor and an evaluation electronics connected to the optical sensor. The method also includes determining measurement data with the optical sensor from a transport unit moving past the optical sensor, and processing the measurement data obtained from the optical sensor with the
(Continued)

evaluation electronics to determine the spatial extent in at least one dimension of the transport unit moving past; and selecting a storage conveyor for storing the transport unit moving past on the basis of the determined spatial extent of the transport unit moving past.

17 Claims, 3 Drawing Sheets

(51) Int. Cl.
| | |
|---|---|
| *B65G 1/04* | (2006.01) |
| *B65G 43/08* | (2006.01) |
| *B65G 47/49* | (2006.01) |
| *B65G 47/64* | (2006.01) |

(56) References Cited

U.S. PATENT DOCUMENTS

| | | | | |
|---|---|---|---|---|
| 6,704,613 | B2 * | 3/2004 | Gomez | B65G 47/5104 |
| | | | | 700/214 |
| 12,091,246 | B2 * | 9/2024 | Altwegg | B65G 43/08 |
| 2012/0193307 | A1 * | 8/2012 | Gardelle | B65G 1/08 |
| | | | | 211/13.1 |
| 2013/0264171 | A1 | 10/2013 | Wend et al. | |
| 2014/0303770 | A1 * | 10/2014 | Wend | B65G 1/1376 |
| | | | | 700/215 |
| 2015/0210482 | A1 | 7/2015 | Sieksmeier et al. | |
| 2015/0274425 | A1 | 10/2015 | Wend | |
| 2017/0225903 | A1 * | 8/2017 | Bouchard | B65G 43/08 |
| 2017/0283173 | A1 * | 10/2017 | Otto | B65G 19/025 |
| 2018/0346242 | A1 | 12/2018 | Grosse et al. | |
| 2019/0210800 | A1 | 7/2019 | Holas et al. | |
| 2020/0062515 | A1 | 2/2020 | Ramseier | |
| 2020/0247610 | A1 | 8/2020 | Mathi et al. | |
| 2021/0403234 | A1 | 12/2021 | Altwegg | |

FOREIGN PATENT DOCUMENTS

| | | | |
|---|---|---|---|
| DE | 195 05 509 | A1 | 8/1996 |
| DE | 297 18 342 | U1 | 2/1998 |
| DE | 10 2006 044 137 | B3 | 2/2008 |
| DE | 10 2007 025 553 | A1 | 12/2008 |
| DE | 10 2010 022 082 | A1 | 12/2010 |
| DE | 10 2010 053 590 | A1 | 6/2012 |
| DE | 10 2011 055 780 | A1 | 5/2013 |
| DE | 10 2012 001 868 | A1 | 7/2013 |
| DE | 10 2016 105 716 | A1 | 10/2017 |
| EP | 0 620 528 | A1 | 10/1994 |
| EP | 1 764 317 | A1 | 3/2007 |
| EP | 2 366 463 | A1 | 9/2011 |
| EP | 2 647 588 | A1 | 10/2013 |
| EP | 2 784 208 | A2 | 10/2014 |
| EP | 3 251 990 | A1 | 12/2017 |
| WO | WO 2014/009138 | A1 | 1/2014 |
| WO | WO 2020/089177 | A1 | 5/2020 |

* cited by examiner

TRANSPORT DEVICE HAVING A STORAGE DEVICE, AND METHOD FOR OPERATING SAME

CROSS REFERENCE TO RELATED APPLICATION

This application is a National Phase filing in the United States, under 35 USC § 371, of PCT International Patent Application PCT/EP2021/059513, filed on 13 Apr. 2021 which claims the priority of Swiss Patent Application CH 00491/20 filed 27 Apr. 2020.

These applications are hereby incorporated by reference herein in their entirety and is made a part hereof, including but not limited to those portions which specifically appear hereinafter.

BACKGROUND OF THE INVENTION

Field of the Invention

The present disclosure relates to the field of intralogistics and concerns methods for operating a transport apparatus with a storage apparatus, and concerns a transport apparatus with a storage apparatus.

Discussion of Related Art

In intralogistics, various apparatuses for conveying goods to be transported are used, wherein the goods to be transported are typically conveyed using suitable transport units. One aspect of intralogistics concerns the storage of transport units in one or more storage means. In particular, the storage means can be a temporary storage means, in which transport units are stored for a specific time and are collected again, as needed, for further conveyance. For example, sorting operations can be carried out with suitable temporary storage means, which plays an important role in particular when picking orders for goods.

Depending on the requirements, the transport units can be conveyed in a conveyor apparatus at a fixed distance from one another or at a variable distance from one another, e.g., in buffer conveyors. In order to increase the conveying capacity and/or the picking capacity, it is desirable to achieve the best possible utilization of the conveyor apparatus. In addition to a space-saving arrangement of the transport units with the smallest possible distance from one another, the fullest possible utilization of the available space in a storage means is an important factor when optimizing utilization.

One example of a conveyor facility with carrying bags, in which the space required for the carrying bags is taken into account, is described in DE 102010053590 A1. The carrying bag includes a hanging point for a bag pouch for receiving goods to be conveyed, wherein the bag pouch has a dimension which assumes a minimum value when said bag pouch is empty and a maximum value when it is loaded with the goods to be conveyed. The carrying bag further includes a spacer which is pivotable between the hanging point and the bag pouch and which is positionable in a stable rest position or in a stable work position, wherein the spacer is configured in such a way that, in its work position, it comes into contact with a subsequent carrying bag and is dimensioned in such a way that a distance measured in the horizontal is set. The configuration of the carrying bag with a settable spacer allows an optimized utilization of space both when empty carrying bags pile up when spacers are in the rest position and also when loaded carrying bags pile up when spacers are in the work position.

SUMMARY OF THE INVENTION

It is therefore an object of the disclosure to provide a method for operating a transport apparatus with a storage apparatus and to provide such a transport apparatus with a storage apparatus, which at least partially improve the prior art with regard to the storage of transport units.

This object is achieved by the features of the independent claims. Advantageous configurations of the disclosure are specified in the dependent claims and in the present description and the figures.

A first aspect of the disclosure relates to a method for operating a transport apparatus with a storage apparatus, wherein the method includes the following steps: providing the transport apparatus with the storage apparatus for storing transport units, including a plurality of transport units, a plurality of storage conveyors which are set up to store transport units, a feeding conveyor which is connected to the storage conveyors via a respective switch, and at least one optical sensor which is arranged at the feeding conveyor, and an evaluation electronics connected to the optical sensor. The method further includes obtaining measurement data with the optical sensor from a transport unit moving past the optical sensor, and processing the measurement data obtained from the optical sensor with the evaluation electronics. Processing here includes evaluating the obtained measurement data in order to determine the spatial extent in at least one dimension of the transport unit moving past. The processing of the measurement data preferably furthermore includes filtering the measurement data in order to obtain measurement points at which an optical parameter lies above a definable threshold value. In addition, selecting a storage conveyor for storing the transport unit moving past on the basis of the determined spatial extent of the transport unit moving past is effected. Selecting a storage conveyor also includes passing the transport unit past the storage apparatus or discharging the transport unit before the storage apparatus. An optical sensor is preferably arranged at the feeding conveyor in front of the switches in order to function in particular as a common optical sensor for all storage conveyors of the storage apparatus.

The disclosure offers the advantage that storing the transport units in the storage conveyors can be adapted to the spatial extent of the transport units to be stored. Since the extent of the transport units is obtained by the optical sensor before they are stored and the evaluation electronics connected to the optical sensor, there is no need to assume a specific mean extent or a specific maximum extent of the transport units in order to control the storage of the transport units in the storage conveyors by means of the controller.

Assuming a mean extent makes it possible to achieve a certain mean capacity utilization of the storage conveyors, but it does not prevent, for example, attempts to store transport units having a large extent in the conveying direction in storage conveyors that do not have sufficient space for these transport units.

In such an operation, it can then happen that a relevant transport unit cannot be stored in a storage conveyor and, for example, gets caught in a switch that connects the feeding conveyor to the storage conveyor.

The assumption of a maximum spatial extent of the transport units can provide a remedy in this regard by always ensuring that storing is carried out only in those storage conveyors in which transport units with the assumed maximum spatial extent would have space. However, this can typically lead to too much space being kept unused in the storage conveyors, which has a negative effect on the capacity utilization of the facility.

Since the spatial extent of each transport unit to be stored is determined before it is stored and the storage conveyor for storing the transport unit is selected on the basis of the determined spatial extent of said transport unit, the filling of the storage conveyors can be continuously optimized. Each transport unit can therefore be stored dynamically and selectively, i.e., by virtue of the fact that the storage conveyor which is optimal at that time for each transport unit, for example the one with a suitable free space, can be selected. The determined spatial extent, on the basis of which a storage conveyor is selected, can be a spatial extent in at least one dimension, specifically in the conveying direction and/or transversely to the conveying direction.

The disclosure offers the further advantage that the spatial extent of the transport units can be determined without negatively influencing the conveyance of the transport units. For example, in order to determine the spatial extent of the transport units, it is not necessary to slow them down or to stop them. Therefore, the highest possible efficiency when conveying the transport units can be ensured. Furthermore, the transport units do not have to be additionally stabilized or aligned in order to determine the spatial extent. This saves on additional components for guiding or stabilizing the transport units in the region of the feeding conveyor in which the optical sensor is arranged. In other words, this determination of the spatial extent is carried out without a guiding or stabilizing device and thus without any additional mechanical effects on the transport unit. This increases the longevity of the transport apparatus, since the transport units are less exposed to mechanical influences.

Depending on the configuration, the measurement data include a plurality of measurement points.

In some embodiments, the evaluation electronics can evaluate measurement points from the measurement data in order to determine the spatial extent in at least one dimension of the transport unit moving past.

The optical sensor preferably measures the measurement data substantially simultaneously at a plurality of points which lie in at least one plane. The measurement points each include a spatial distance between the passing transport unit and the optical sensor and also the optical parameter. The plane is usually parallel to the conveying direction of the transport units in the feeding conveyor. Depending on the configuration, the points obtained by the optical sensor can lie in a plurality of adjacent planes and form a grid or raster of measurement points. Obtaining a plurality of measurement points substantially simultaneous allows the transport unit to move past during the obtainment without being slowed down and also without negatively affecting the accuracy of the data obtained and the spatial extent of the transport unit determined therefrom.

Advantageously, the optical sensor furthermore measures the optical parameter at the respective measurement point of the reflection of light at the transport unit moving past, wherein the optical parameter is an intensity or a polarization. In some embodiments, the optical sensor measures the presence of a reflection at each measurement point, this allows the spatial extent of the transport unit in at least one dimension to be determined. The evaluation electronics determines the maximum distance between measurement points at which a reflection from the transport unit moving past has been determined.

In some embodiments, the optical sensor measures the intensity of the reflection of the light from the transport unit moving past. The intensity is generally dependent on the alignment of the reflecting surface of the transport unit; the greater the angle is between the surface normal of the reflecting surface and the directions of incidence/emission from which the reflection is determined, the smaller is the intensity of the reflection, wherein it is assumed that the directions of incidence/emission are substantially identical. In other words, in the case of a transport apparatus which is cuboid, for example, it can be aligned to the optical sensor during obtaining of the measurement data in such a way that measurement points are determined from two adjacent side surfaces. As a result, the measurement points on the side surface whose surface normal has a smaller angle with the direction of incidence of light and the direction of emission from which the reflection is determined have a greater intensity than the measurement points on the adjacent side surface. This can be used to filter the measurement data based on the intensity in order to obtain those measurement points that lie above a definable threshold value. The threshold value can be defined depending on the area of application. Furthermore, the threshold value can be adapted in order to react to changing ambient conditions, for example. The threshold value is advantageously selected in such a way that only measurement points that belong to one side of the transport unit are obtained during filtering. In the example above, this allows the measurement points to be filtered so that only measurement points from the side surface of the example transport unit facing the sensor are obtained after filtering based on the intensity.

In an advantageous configuration, a laser or an LED is used to emit the light.

The evaluation electronics can evaluate the filtered measurement points using regression methods in order to determine the spatial extent of the transport unit in at least one dimension. Alternatively, or additionally, the evaluation electronics can determine the alignment of the transport unit to the optical sensor at the time the measurement data are obtained using regression methods. The regression methods used can include here, for example, the method of least squares.

In some embodiments, the optical sensor obtains measurement data two or more times from the transport unit moving past. This allows the evaluation electronics to determine in each case a value for the spatial extent in at least one dimension of the transport unit moving past from the obtained measurement data. Advantageously, the evaluation electronics determines a mean value for the spatial extent based on the individual determined values for the spatial extent. The determination of the mean can include the formation of an arithmetic mean. Alternatively, or additionally, determining the mean value can furthermore include truncation of extreme values. This improves the accuracy of the spatial extent determined and the reliability of the method.

The evaluation electronics can advantageously process the optical measurement data obtained from the at least one optical sensor in order to determine the spatial extent of the transport unit moving past in a first dimension and in a second dimension, wherein the first dimension is substantially perpendicular to the second dimension. In this case, the measurement data includes measurement points that are arranged in a plurality of planes, in particular are arranged in a grid or raster.

The transport unit is advantageously moved past the optical sensor at a substantially constant speed during the determination of the measurement data. This speed corresponds to a conveying speed which is usual for the transport apparatus. It is not necessary to reduce the conveying speed while the optical sensor is obtaining the measurement data, which means that losses in efficiency and increased technical complexity for the transport apparatus can be avoided.

Depending on the configuration, the transport unit moving past can include a carriage, on which a suspended carrying unit for receiving and/or carrying along goods to be transported is attached so as to be pivotable and/or rotatable. This means that at the time the measurement data are obtained by the sensor, the carrying unit can be twisted or pivoted out of a rest position in relation to the carriage, or can be twisted and pivoted away.

A further aspect of the disclosure is directed toward a transport apparatus with a storage apparatus for storing transport units, including a plurality of transport units, a plurality of storage conveyors, which are set up to store transport units, and a feeding conveyor which is connected to the storage conveyors via a respective switch. Furthermore, the transport apparatus includes at least one optical sensor arranged at the feeding conveyor, which is configured to obtain measurement data from a transport unit moving past the optical sensor, and an evaluation electronics connected to the optical sensor. This evaluation electronics is configured to evaluate the measurement data obtained from the optical sensor in order to determine the spatial extent in at least one dimension of the transport unit moving past. Advantageously, the evaluation electronics can furthermore be configured to filter the measurement data in order to obtain measurement points at which an optical parameter lies above a definable threshold value. A controller connected to the evaluation electronics is configured to select a storage conveyor for storing the transport unit based on the determined spatial extent of the transport unit. The optical sensor is preferably arranged at the feeding conveyor in front of the switches.

The evaluation electronics can be connected here to the controller wirelessly or via a cable for transmitting the spatial extent of the transport unit.

In one embodiment, the current number of transport units stored in the respective storage conveyors, the spatial extents in the conveying direction associated with the stored transport units, and the lengths of the storage conveyors are storable in the controller, wherein the controller is set up to determine the free lengths of the respective storage conveyors from the lengths of the respective storage conveyors, the number of stored transport units and the associated extents in the conveying direction, and to control the respective switches in such a way that the switches store a transport unit into a storage conveyor with a free length which is greater than or equal to that of the determined spatial extent of the transport unit in the conveying direction.

In a preferred configuration, the storage conveyors leave the feeding conveyor as branches, wherein the branches are preferably arranged at right angles with respect to the feeding conveyor.

By determining the free lengths of the storage conveyors, it is possible based on the determined spatial extents of the transport units to be stored in the conveying direction, to advantageously ensure on the one hand that a transport unit is stored in each case in a storage conveyor with sufficient space available and on the other hand that it can be prevented that there is no available space in a storage conveyor which is not fully utilized.

The controller is preferably configured to record or update the current number of transport units stored in a storage conveyor each time a switch is actuated for storing a transport unit in that storage conveyor.

Optionally, a counting apparatus can also be arranged in each case at the storage conveyors or the switches, which counts the transport units stored in a storage conveyor and transmits the number to the controller.

Furthermore, the controller is preferably configured to record the associated storage conveyor in which the respective transport unit was stored for each transmitted spatial extent of stored transport units, so that the current number of transport units with the associated extents in the conveying direction is advantageously always saved in the controller.

The controller can then easily determine the free length of a storage conveyor from the saved length of the storage conveyor, the current number of transport units stored in this storage conveyor and the associated extents in the conveying direction. The controller can therefore advantageously ensure that a transport unit to be stored is stored in a storage conveyor with sufficient free space by virtue of the fact that the controller compares the determined spatial extent of this transport unit in the conveying direction with the free lengths of the storage conveyors. In addition, the controller can advantageously prevent storage conveyors that still have sufficient space for a transport unit from remaining unused for a prolonged period of time.

Since the utilization of the storage conveyors can advantageously be controlled by determining the spatial extent of the transport units, a fullness sensor can be dispensed with, for example, as a result of which cabling can be saved, among other things.

There is therefore the advantage that the controller can always be up-to-date with regard to the filling level of the storage conveyors and the transport units to be stored and can optimally control the storage of the transport units accordingly.

The spatial extent of the transport unit can be determined, inter alia, vertically and/or horizontally transversely to the conveying direction and/or along the conveying direction. In the case of transport units with bags, the extent to be determined can be the depth, width and/or height of the bag.

In some embodiments, the optical sensor is configured to obtain the measurement data substantially simultaneously at a plurality of points. The points obtained by the optical sensor are advantageously located in at least one plane and each includes a spatial distance between the passing transport unit and the optical sensor, and also the optical parameter. Depending on the area of application, the points obtained by the optical sensor can lie in a plurality of adjacent planes and form a grid or raster of measurement points.

The optical sensor is furthermore advantageously configured in such a way as to obtain, as optical parameters, an intensity or a polarization in the respective measurement point from the reflection of the light.

To process the measurement data obtained from the optical sensor, the evaluation electronics can be configured in such a way that it determines the spatial extent of the transport unit in at least one dimension and/or the alignment of the transport unit to the optical sensor at the time the measurement data are determined, from the measurement points of the filtered measurement data using regression methods.

In some embodiments, the optical sensor furthermore includes a light source for emitting the light, so that the direction of emission of the light and the direction of incidence in which the measurement data are determined substantially match. In order to avoid shading when the measurement data are determined by the optical sensor, the latter is advantageously arranged in such a way that an optical axis of the optical sensor is aligned substantially perpendicularly to the conveying direction.

In some embodiments, the optical sensor is designed as a 2D or 3D profile sensor, which in particular includes a light source and/or a detection unit. Depending on the area of application, however, radio-frequency antenna arrays for determining the measurement data are also conceivable.

In some embodiments, the optical sensor is designed as a camera, and the measurement data include individual images or sequences of multiple images, which are processed by the evaluation electronics, for example using a trained neural network, in order to determine the spatial extent in at least one dimension of the transport unit moving past.

In one configuration, the transport units each have an identification element, preferably a barcode, a QR code, an RFID tag or the like.

This offers the advantage that the transport units are identifiable. In particular, the unique identifications of the transport units can be saved in the controller and the transport units can preferably be tracked individually.

In one configuration, a reading apparatus is arranged at the feeding conveyor, which is connected to the controller and is set up to read the identification element of a transport unit and to transmit the information read to the controller, wherein the controller is preferably set up to forward the information read to a determined spatial extent of the transport unit obtained from the evaluation electronics.

In this way, a determined spatial extent can be linked to an identification of a transport unit in the controller. The reading apparatus can be arranged immediately before or after the optical sensor. In this context, "immediately" means that, as a rule, after the reading by the reading apparatus, the measurement data are determined and the spatial extent of the same transport unit is determined with the evaluation electronics, or after the ascertainment of the measurement data and the determination of the extent by the evaluation electronics the identification element of the same transport unit is read. The reading apparatus and the optical sensor can also be arranged at the same height in relation to the conveying direction, e.g., on opposite sides of the feeding conveyor.

The reading apparatus can, for example, include an RFID reader, a barcode reader, a QR code reader or the like.

In one configuration, the transport units each have a carrying unit, preferably a bag, for carrying goods to be transported.

Goods to be transported can include one or more products. A person skilled in the art understands bags to mean containers such as pouches, boxes, sacks, envelopes, baskets, boxes, wire racks, etc.

In further configurations, the carrying units can include hooks, clothes hangers, frames, transport racks, clamps, grippers, direct outer packaging, etc.

In the abovementioned embodiments of the transport unit with a carrying unit, which is configured as a bag or the like, the measurement data are usually obtained by the optical sensor from the bag. In embodiments in which the goods to be transported are conveyed by means of hooks of the transport unit or the like, the measurement data are typically determined from the goods to be transported.

In one configuration, the transport units each include a carriage, hanging on which the carrying units are each attachable so that they are pivotable and/or rotatable, wherein the carriage is preferably conveyable in the storage apparatus in a hanging manner.

The storage apparatus can include at least one running rail on which the carriages are conveyable.

A common optical sensor and common evaluation electronics are preferably provided for all storage conveyors. This offers the advantage that a separate optical sensor does not have to be provided for each storage conveyor and the construction of the storage apparatus can be simplified. Furthermore, the control architecture and thus the control effort can be reduced since all spatial extents are determined by the common evaluation electronics and transmitted to the controller.

In one configuration, the controller is set up to control the switches each in such a way that the first switches guide a transport unit with an extent in the conveying direction which is greater than the free length of a storage conveyor past that storage conveyor.

This can prevent a transport unit from being stored in a storage conveyor in which there is not sufficient space, which further reduces the risk of, for example, a transport unit getting caught in a switch and the storage apparatus and the switch failing as a result.

In one configuration, the storage apparatus includes a path guidance conveyor, which is connected to the storage conveyors via two switches in each case.

In a preferred configuration, the storage conveyors are arranged as branches between the feeding conveyor and the path guidance conveyor, wherein the branches are preferably arranged at right angles both to the feeding conveyor and to the path guidance conveyor.

In the feeding conveyor and/or the path guidance conveyor and/or the storage conveyors, the transport units can be conveyed at a variable or fixed distance from one another, depending on the configuration. In particular, the feeding conveyor and/or the path guidance conveyor and/or the storage conveyors can be configured as gravitational conveyor conveyors or as clocked conveyor conveyors.

Alternatively, or additionally, the controller can prioritize a plurality of storage conveyors in which a transport unit can be stored based on the free lengths of the storage conveyors, e.g., by selecting storage conveyors for storage according to decreasing free length.

BRIEF DESCRIPTION OF SEVERAL VIEWS OF THE DRAWINGS

Embodiments of the disclosure are explained in more detail using the following figures and the associated description. In the figures.

DETAILED DESCRIPTION OF THE INVENTION

In order to illustrate the disclosure, preferred embodiments are described in more detail with reference to the figures.

Figure 1:
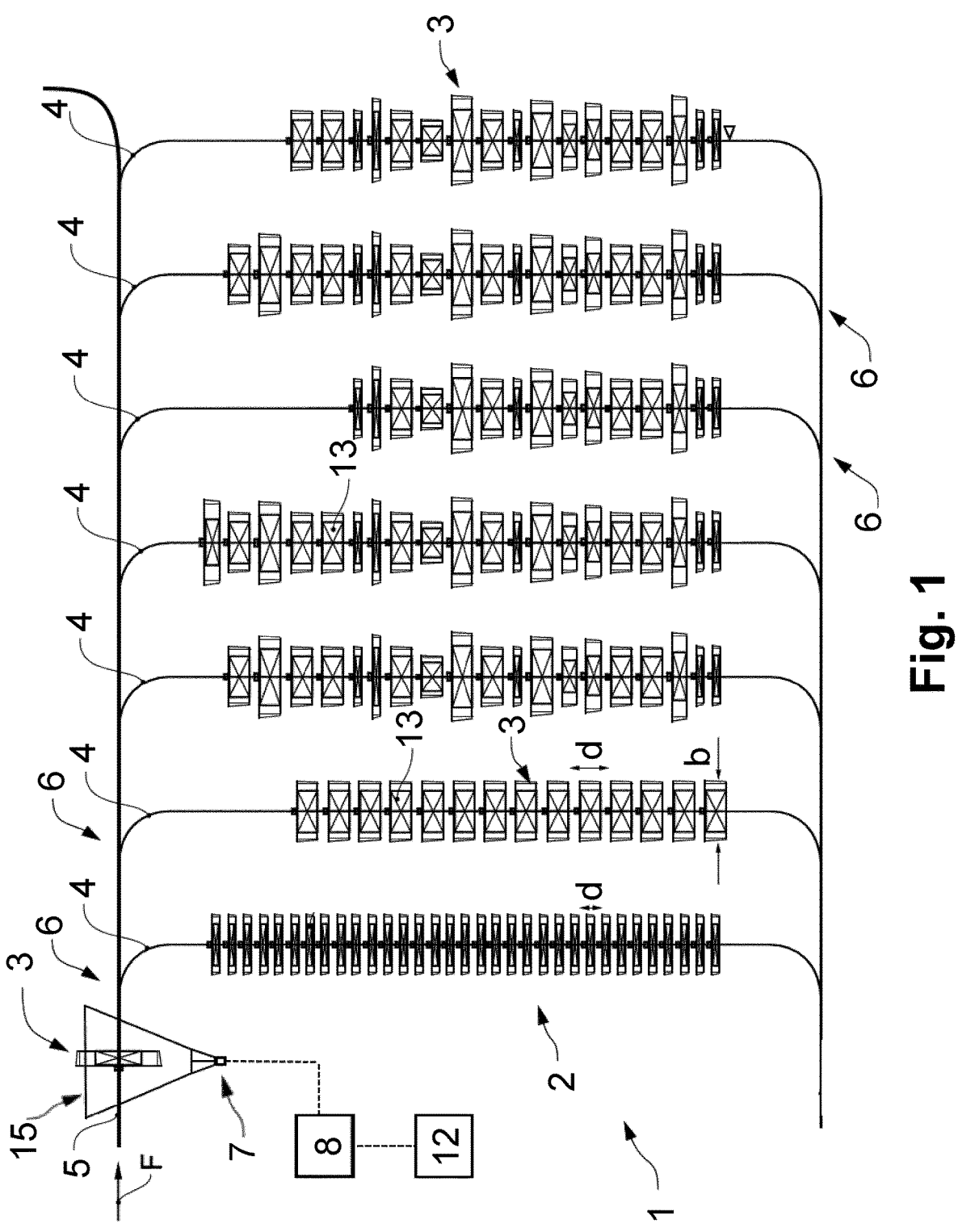
FIG. 1 shows a schematic illustration of an embodiment of a transport apparatus with a storage apparatus.

FIG. 1 shows a schematic illustration of an embodiment of a transport apparatus 1 including a storage apparatus 2 with a feeding conveyor 5, a plurality of storage conveyors 4, a plurality of transport units 3 holding goods 13 to be transported, and a controller 12. In the shown embodiment, the storage apparatus 2 includes seven storage conveyors 4. The feeding conveyor 5 is connected to the storage conveyors 4 via switches 6. An optical sensor 7, which is set up to obtain measurement data of the transport units 3, is arranged at the feeding conveyor 5 in front of the switches 6. The evaluation electronics 8 connected to the optical sensor 7 is set up to evaluate measurement data obtained from the optical sensor 7 in order to determine the spatial extent of the transport unit 3 in particular in the conveying direction F. The spatial extent of a transport unit 3 in the conveying direction F is substantially determined by the respective goods 13 to be transported. The spatial extents of the transport units 3 can also be different transversely to the conveying direction F, but the spatial extent is substantially specified by the geometry of the bags 10 of the transport units 3 and is not or only insignificantly dependent on the goods 13 to be transported. The evaluation electronics 8 transmits the spatial extent of a transport unit 3 in the conveying direction F, which is conveyed past the optical sensor 7, to the controller 12, which selects, based on the obtained spatial extent, a storage conveyor 4 that has a free length greater than or equal to the determined spatial extent of the transport unit in the conveying direction F. In the embodiment shown, the optical sensor 7 is arranged laterally next to the feeding conveyor 5, but an arrangement of the optical sensor 7 below or above the feeding conveyor 5 is also conceivable. In this arrangement, the optical sensor 7 can alternatively or additionally determine measurement data of the transport unit 3 transversely to the conveying direction F, and the evaluation electronics 8 can alternatively or additionally determine from the measurement data the spatial extent of the transport unit 3 transversely to the conveying direction F.

The free lengths of the storage conveyors 4 are determined and continuously updated by the controller 12 from the length of the respective storage conveyors 4, the number of transport units 3 stored in the respective storage conveyors 4, and the associated spatial extents in the conveying direction F.

A reading apparatus (not shown) in the form of a barcode reader can also be arranged at the feeding conveyor 5 immediately after the optical sensor 7, which reading apparatus is set up to read an identification element of a transport unit 3 and to transmit the read identification to the controller 12. The controller 12 assigns the read identification to the spatial extent of the transport unit 3 obtained from the evaluation electronics 8. FIG. 1 shows a transport unit 3 in the feeding conveyor 5, which transport unit 3 is located in the measurement field 15 of the optical sensor 7. This situation is shown in detail in FIG. 2.

Figures 2, 3A:
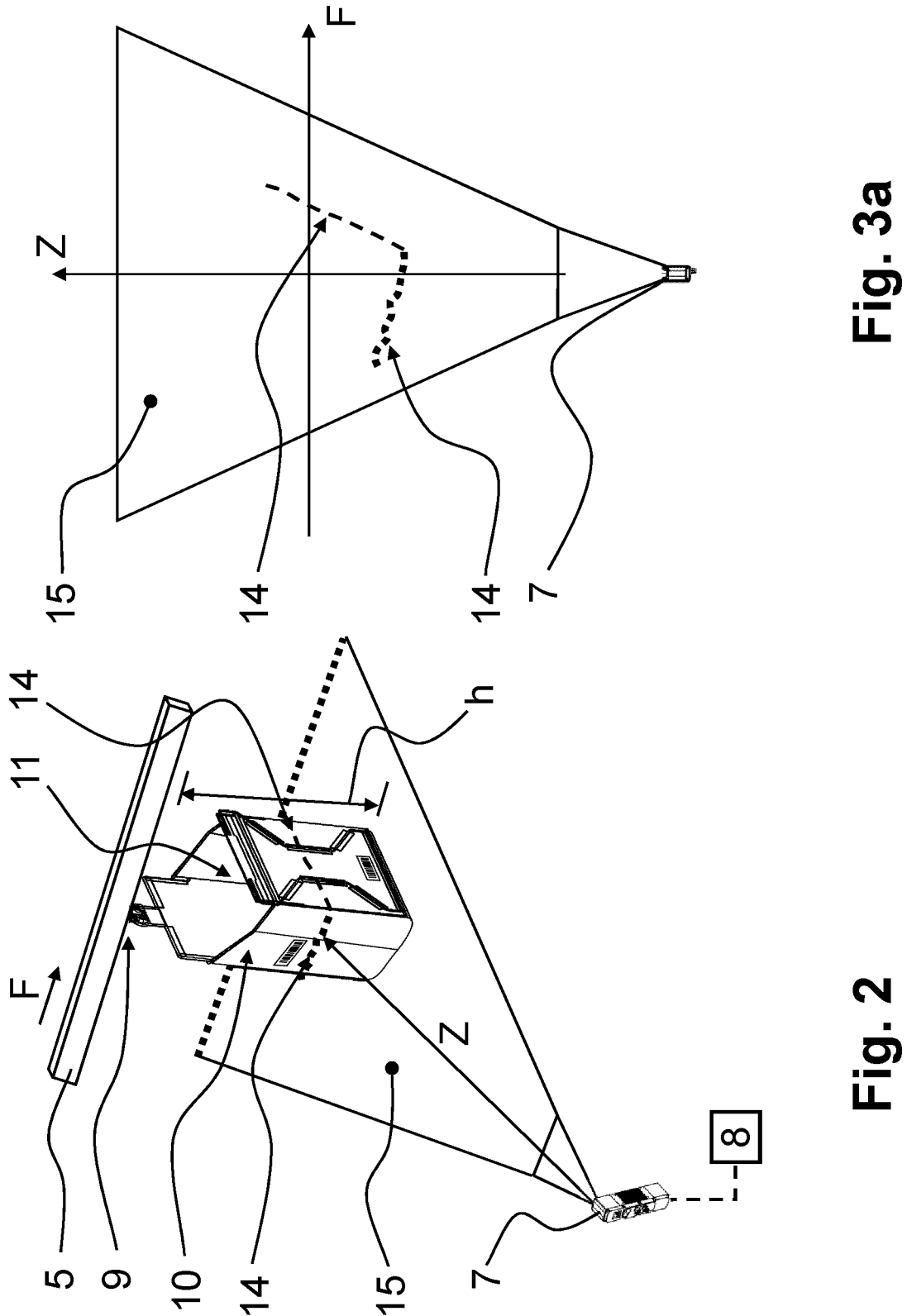
FIG. 2 shows a perspective and schematic illustration of an embodiment of an optical sensor at a feeding conveyor.
FIG. 3a shows a schematic illustration of a processing step of the evaluation electronics.

FIG. 2 shows the optical sensor 7 designed as 2D profile sensor, and a transport unit 3 moving past, which is located in the measurement field 15 of the optical sensor 7. In the embodiment shown, the measurement field 15 of the optical sensor 7 is a plane 15, which is aligned parallel to the conveying direction F and in which the reflection in individual points 14 is measured by the optical sensor 7. An optical axis Z of the optical sensor 7 is aligned substantially perpendicularly to the conveying direction F and lies in the plane of the measurement field 15. The evaluation electronics 8 also shown in FIG. 2 processes the measurement data obtained from the optical sensor 7 in order to determine the spatial extent of the transport unit 3 moving past.

Figure 3C:
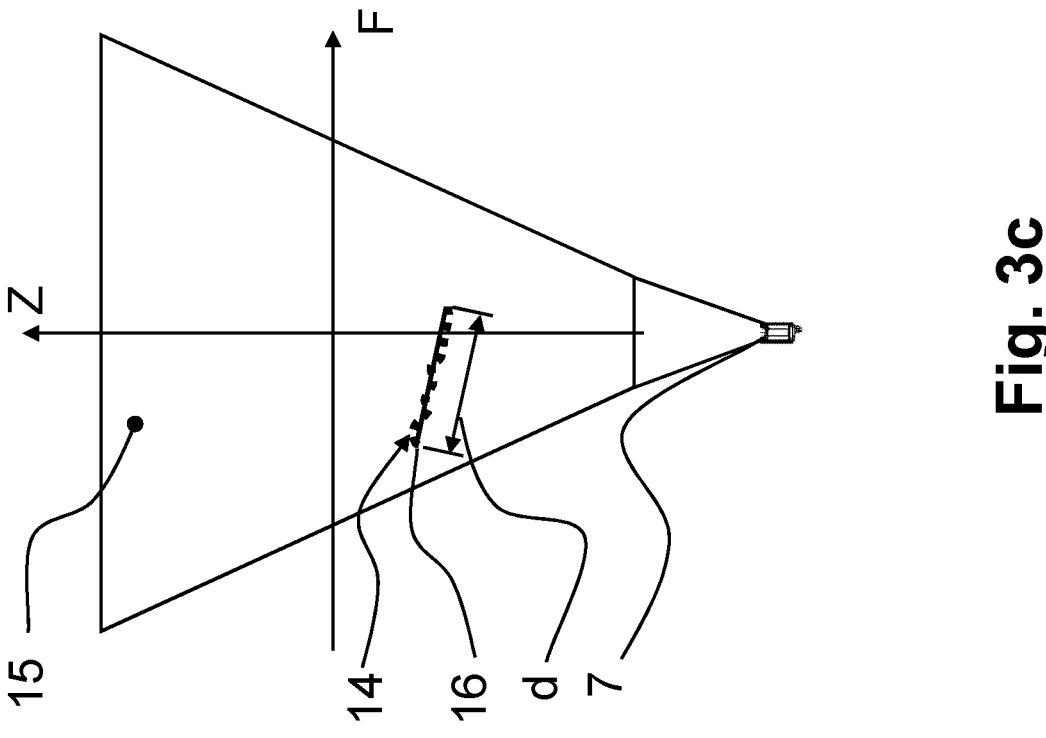
FIG. 3c shows a schematic illustration of another processing step of the evaluation electronics.
Figure 3B:
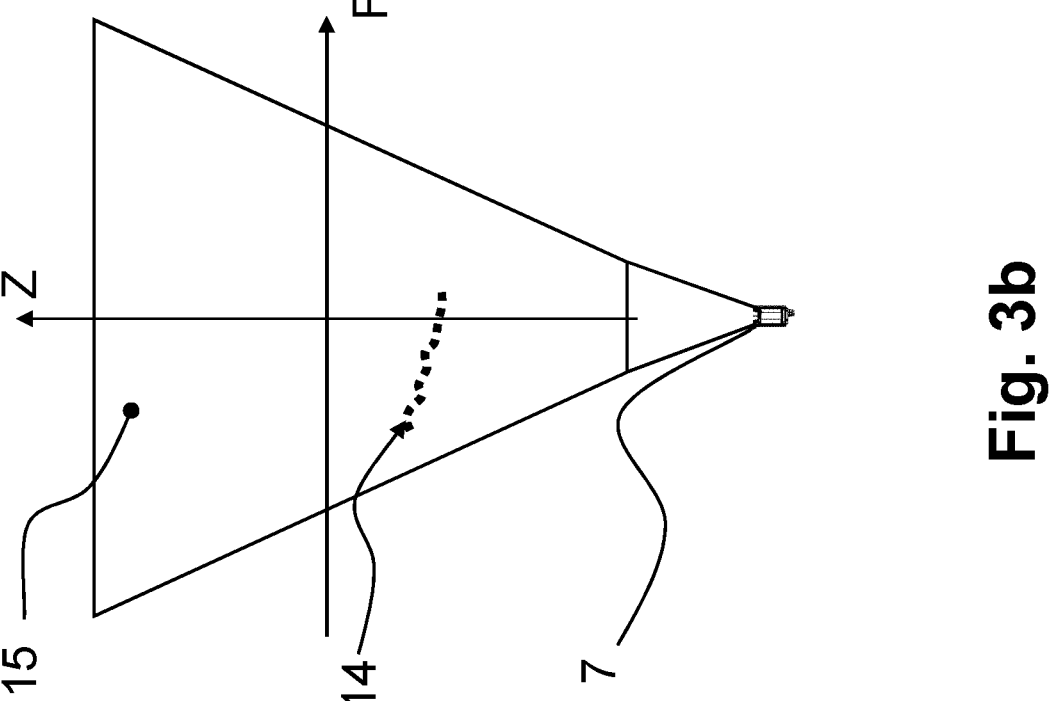
FIG. 3b shows a schematic illustration of another processing step of the evaluation electronics.

Individual exemplary intermediate steps of the processing of the measurement data carried out by the evaluation electronics 8 are shown in FIGS. 3a to 3c. The measurement data here include the spatial distance between the optical sensor 7 and the transport unit 3 moving past at individual points 14, and also the intensity of the reflection of a light at each measurement point 14. This light is emitted by a light source installed in the optical sensor 7 for determining the measurement data, wherein the light source includes, for example, an LED or a laser. Furthermore, the optical sensor 7 includes a detection unit with, for example, a CCD (charge coupled device) or a CMOS (complementary metal-oxide-semiconductor) detector.

The measurement data include a lateral profile of the transport unit 3 moving past. The measurement points 14 are plotted in FIGS. 3a to 3c by way of example in an orthogonal coordinate system, whose axes form the conveying direction F and the optical axis Z. The position of the optical sensor 7 is also indicated. The measurement field 15 of the optical sensor 7 lies in the plane 15 defined by the coordinate system.

As can be seen in FIG. 3a, the plane is dependent on the alignment of a reflecting surface of the transport unit 3. The larger the angle between the surface normal of the reflecting surface and the optical axis Z is, the smaller is the intensity of the reflection which is determined by the optical sensor 7 in the direction of the optical axis Z. With the alignment and configuration of the transport unit 3 shown, the intensity at the measured points on the side of the transport unit 3 facing the optical sensor 7 is higher than the intensity of the measured points on the front side of the transport unit 3.

The evaluation electronics 8 is set up to filter the measurement data obtained from the optical sensor 7 using an optical parameter; the result of this filtering can be seen in FIG. 3b by way of example. The optical parameter which is used to filter the measurement data is the previously described intensity, and so measurement points are obtained for which the optical parameter lies above a definable threshold value. In the present case, only measurement points from the side of the transport unit 3 facing the optical sensor 7 remain after the filtering.

The evaluation electronics 8 is also set up to determine the spatial extent of the transport unit 3 in the conveying direction F from the remaining measurement points. This determination is shown by way of example in FIG. 3c, wherein the evaluation electronics 8 determines a compensation line 16 using the measurement points by means of regression methods. The compensation line is characterized, among other things, by its length and its angle to the conveying direction F wherein the length of the compensation line 16 corresponds to the spatial extent of the transport unit 3 in the conveying direction F. Alternatively, or additionally, the evaluation electronics 8 can also be set up to determine the spatial extent of the transport unit 3 transversely to the conveying direction F, for example its height h, which can be seen in FIG. 2.

In the embodiment shown in FIG. 2, the optical sensor 7 repeatedly determines measurement data from the transport unit 3 moving past. This allows the evaluation electronics 8 in each case to determine a value for the spatial extent in the conveying direction F of the transport unit 3 moving past from the determined measurement data. Moreover, the evaluation electronics 8 determines a mean value for the spatial extent based on the individual determined values for the spatial extent of the transport unit 3 in the conveying direction F. The determination of the mean value includes the formation of an arithmetic mean.

The transport unit 3 shown in FIG. 2 includes a carriage 9, hanging on which a carrying unit 10 for carrying goods 11 to be transported is attached so as to be pivotable and rotatable. The carrying unit 10 of the transport unit 3 is designed as a bag and is configured to swing and twist on the carriage while the transport unit 3 is moved past the optical sensor 7. The transport unit 3 is moving past the optical sensor 7 without braking, at a speed that corresponds to the typical conveying speed of the transport apparatus 1.

It should be noted that reference signs are equivalent across all figures and always indicate the same object.

The invention claimed is:

1. A method for operating a transport apparatus (1) with a storage apparatus (2), wherein the method includes the following steps:
   a. providing the transport apparatus (1) with the storage apparatus (2) for storing transport units (3), including a plurality of transport units (3), a plurality of storage conveyors (4) which are configured to store transport units (3), a feeding conveyor (5) which is connected to the storage conveyors (4) via a respective switch (6), at least one optical sensor (7) arranged at the feeding conveyor (5) in front of the switches (6), and an evaluation electronics (8) connected to the optical sensor;
   b. obtaining measurement data with the optical sensor (7) from a transport unit (3) moving past the optical sensor (7);
   c. processing the measurement data obtained from the optical sensor (7) with the evaluation electronics (8), wherein the processing includes the following step:
      i. evaluating the measurement data in order to determine the spatial extent in at least one dimension of the transport unit (3) moving past; and
   d. selecting a storage conveyor (4) for storing the transport unit (3) moving past on the basis of the obtained spatial extent in at least one dimension of the transport unit (3) moving past, wherein the transport unit (3) moving past includes a carriage (9), on which a carrying unit (10) for carrying goods (13) to be transported is attached in a suspended manner, which carrying unit (10) is pivotable and/or rotatable.

2. The method as claimed in claim 1, wherein the evaluation electronics (8) evaluates measurement points from the measurement data in order to determine the spatial extent in at least one dimension of the transport unit (3) moving past.

3. The method as claimed in claim 2, wherein, for processing the measurement data obtained from the optical sensor (7), the evaluation electronics (8) furthermore filters the measurement data in order to obtain measurement points at which an optical parameter lies above a definable threshold value.

4. The method as claimed in claim 3, wherein the optical sensor (7) measures the measurement data simultaneously at a plurality of points which lie in at least one plane (15) and each include a spatial distance between the passing transport unit and the optical sensor (7), and also the optical parameter.

5. The method as claimed in claim 3, wherein the optical sensor (7) furthermore measures the optical parameter in the respective measurement point from a reflection of light at the transport unit (3) moving past.

6. The method as claimed in claim 3, wherein the evaluation electronics (8) determines the spatial extent of the transport unit (3) in at least one dimension and/or the alignment of the transport unit (3) to the optical sensor (7) at the time the measurement data are determined, from the measurement points of the filtered measurement data using regression methods.

7. The method as claimed in claim 1, wherein the optical sensor (7) two or more times determines measurement data from the transport unit (3) moving past, and the evaluation electronics (8) determines, in each case from the determined measurement data, a value for the spatial extent in at least one dimension of the transport unit (3) moving past and determines a mean value for the spatial extent based on the values.

8. The method as claimed in claim 1, wherein the evaluation electronics (8) processes the optical measurement data obtained from the at least one optical sensor (7) in order to determine the spatial extent of the transport unit (3) moving past in a first dimension and in a second dimension, wherein the first dimension is perpendicular to the second dimension.

9. The method as claimed in claim 1, wherein the transport unit (3) is moved past the optical sensor (7) at a constant speed during the determination of the measurement data, and this speed corresponds to a conveying speed which is typical of the transport apparatus.

10. A transport apparatus with a storage apparatus (2) for storing transport units (3), comprising:
   a plurality of transport units (3), a plurality of storage conveyors (4) which are set up to store transport units (3), a feeding conveyor (5) which is connected to the storage conveyors (4) via a respective switch (6), and
   a. at least one optical sensor (7) which is arranged at the feeding conveyor (5) and is configured to determine measurement data from a transport unit (3) out of the plurality of transport units (3) moving past the optical sensor (7); and
   b. an evaluation electronics (8) which is connected to the optical sensor (7) and is configured to evaluate the measurement data obtained from the optical sensor (7) in order to determine the spatial extent in at least one dimension of the transport unit (3) moving past; and
   c. a controller (12) which is connected to the evaluation electronics (8) and is configured to select a storage conveyor (4) for storing the transport unit (3) on the basis of the determined spatial extent in at least one dimension of the transport unit (3), wherein the transport units (3) each comprise a carrying unit (10) for carrying goods (13) to be transported and the transport units (3) each include a carriage (9), on which hanging carrying units (10) are each attachable so as to be pivotable and/or rotatable, wherein the carriage (9) is conveyable in a hanging manner in the storage apparatus (2).

11. The transport apparatus (1) as claimed in claim 10, wherein the evaluation electronics (8) is furthermore configured to evaluate measurement points from the measurement data in order to determine the spatial extent in at least one dimension of the transport unit (3) moving past.

12. The transport apparatus (1) as claimed in claim 10, wherein the evaluation electronics (8) is furthermore configured, for processing the measurement data obtained from the optical sensor (7), to filter the measurement data in order to obtain measurement points at which an optical parameter lies in each case above a definable threshold value.

13. The transport apparatus (1) as claimed in claim 12, wherein the optical sensor (7) is configured to determine the measurement data simultaneously in a plurality of points that lie in at least one plane and each include a spatial distance between the passing transport unit and the optical sensor (7), and also the optical parameter.

14. The transport apparatus (1) as claimed in claim 13, wherein the optical sensor (7) is furthermore configured in such a way as to determine, as optical parameters, an intensity or a polarization in the respective measurement point from the reflection of the light.

15. The transport apparatus (1) as claimed in claim 10, wherein the evaluation electronics (8) is configured to determine the spatial extent of the transport unit (3) in at least one dimension and/or the alignment of the transport unit to the optical sensor (7) at the time the measurement data are determined, from the measurement points of the selected measurement data using regression methods.

16. The transport apparatus (1) as claimed in claim 10, wherein the optical sensor (7) is arranged in such a way that an optical axis of the optical sensor (7) is aligned substantially perpendicular to the conveying direction.

17. The transport apparatus (1) as claimed in claim 10, wherein the optical sensor (7) is designed as 2D or 3D profile sensor, which in particular includes a light source and/or a detection unit.

\* \* \* \* \*